United States Patent

Tsukimoto et al.

Patent Number: 5,359,251
Date of Patent: Oct. 25, 1994

[54] VIBRATION DRIVEN ACTUATOR

[75] Inventors: Takayuki Tsukimoto, Fujisawa; Shinichi Koreeda, Kawasaki, both of Japan

[73] Assignee: Canon Kabushiki Kaisha, Tokyo, Japan

[21] Appl. No.: 9,994

[22] Filed: Jan. 27, 1993

[30] Foreign Application Priority Data

Jan. 29, 1992 [JP] Japan ................. 4-013824

[51] Int. Cl.$^5$ ............................ H01L 41/08
[52] U.S. Cl. ............................ 310/323; 310/325
[58] Field of Search ............... 310/323, 325, 328

[56] References Cited

U.S. PATENT DOCUMENTS

| | | | |
|---|---|---|---|
| 4,562,374 | 12/1985 | Sashida | 310/323 |
| 4,705,980 | 11/1987 | Mishiro | 310/323 |
| 4,812,697 | 3/1989 | Mishiro | 310/323 |
| 5,124,611 | 6/1992 | Tamai et al. | 310/323 |
| 5,134,333 | 7/1992 | Atsuta | 310/323 |
| 5,162,692 | 11/1992 | Fujimura | 310/323 |
| 5,166,572 | 11/1992 | Ohnishi | 310/323 |

FOREIGN PATENT DOCUMENTS

| | | |
|---|---|---|
| 0469883 | 2/1992 | European Pat. Off. . |
| 2026283 | 1/1990 | Japan . |
| 4026385 | 1/1992 | Japan . |

*Primary Examiner*—Mark O. Budd
*Attorney, Agent, or Firm*—Fitzpatrick, Cella, Harper & Scinto

[57] ABSTRACT

A vibration driven motor or actuator includes a vibrating member for generating a vibration therein in response to an electrical signal applied thereto, and a contact member frictionally engaged with the vibrating member to be driven by the vibration. The contact member has a structure for causing sin and cos modes of the vibration generated in the contact member to have different natural frequencies when the contact member is driven by the vibration.

20 Claims, 6 Drawing Sheets

VIBRATION DRIVEN ACTUATOR

BACKGROUND OF THE INVENTION

1. Field of the Invention

The present invention relates to a vibration driven motor or actuator. More particularly, it relates to a vibration driven motor or actuator, which vibrates an elastic member, such as a bar-shaped vibrating member, by supplying electrical energy on electro-mechanical energy conversion elements provided to the bar-shaped elastic member. The vibration causes surface portions of the vibrating member to follow a circular or elliptic motion, thereby frictionally driving a movable member urged against the vibrating member. Such motor or actuator is especially suitable for optical equipment such as cameras and OA equipment such as printers.

2. Related Background Art

A bar-shaped vibration driven motor excites surface portions of a bar-shaped vibrating men%her to follow a circular or elliptic motion, thereby frictionally driving a movable member urged against the vibrating member.

Since the magnitude of the circular or elliptic motion is at most about several μm, the vibrating member and a rotor must be finished to have a contact surface precision which is high enough to cover this magnitude, so as to maintain a contact state over the entire peripheral surface of the vibrating member. However, in practice, the vibrating member and the rotor cannot have such a high precision at a reasonable working cost. For this reason, spring characteristics are provided to the contact portion of the rotor so as to maintain the contact state over the entire peripheral surface of the vibrating member.

A vibration driven motor driven according to the above-mentioned driving principle has motor characteristics which exhibit a high torque at a low speed.

Therefore, since no gears are required for decelerating the motor, the vibration driven motor is utilized in products such as a camera, which must solve a gear noise problem, and requires quietness.

However, the vibration driven motor often generates noise during driving.

Such noise is caused by a non-driving vibration generated in the motor in addition to the vibration for driving the motor. The vibration is caused by a travelling wave.

The present applicant has proposed various countermeasures against this vibration. However, slight noise still remains.

FIG. 2 shows an observation result, using a microphone, of a vibration spectrum obtained when noise is generated during driving.

In FIG. 2, $1f$ is the driving frequency of the vibrating member, $2f$ is a frequency component twice the frequency $1f$, and $4f$ is a frequency in an audible frequency range (20 kHz or lower), which generates noise.

These frequencies satisfy a relation $3f-1f=4f$.

Since the driving frequency is the frequency of an AC signal supplied to generate a driving vibration, it can be shifted by $\Delta f$. If the shifted frequency is represented by $f_s$, it changes to satisfy $1f_s=1f+\Delta f$, $2f_s=2f+2\Delta f,\ldots$. On the other hand, the frequencies $4f$ and $3f$ change to satisfy the equations $4f_s=4f-\Delta f$ and $3f_s=3f$, respectively.

Therefore, the vibration spectrum of noise corresponds to a differential frequency $(4f_s=3f-1f-\Delta f)$ between the frequency $3f$ and the driving frequency, and the frequency $3f$ can be considered as some natural vibration.

Upon examination of this natural vibration, it was found that the natural vibration was a bending vibration of a rotor main ring 2 shown in FIG. 3. FIG. 4 is a perspective view of the rotor main ring 2. In FIG. 4, a solid line represents the rotor main ring 2 before deformation, and a dotted line represents a bending vibration mode. A contact spring 2a (see FIG. 3) also suffers from a bending deformation to follow the main ring portion 2 although it is not shown in FIG. 4.

The object of the prevent invention is to present generation of such a vibration of the rotor main ring 2.

In addition, another noise may often be generated in addition to the above-mentioned noise.

FIG. 5 shows a vibration spectrum of this noise. Frequencies $1f$, $2f$, $3f$, and $4f$ respectively represent the spectra of the driving vibration $(1f)$, a vibration $(2f)$ having a frequency twice the driving frequency, a natural vibration $(3f)$ causing noise, and a vibration $(\Delta f)$ of noise like in FIG. 2. In FIG. 5, however, these frequencies satisfy $4f=1f-(2f-3f)$.

Upon examination of the natural vibration $3f$, it was found that the natural vibration was a bending vibration of the rotor contact spring 2a shown in FIG. 3. FIG. 6 shows the vibration mode of the contact spring 2a.

In this mode, the deformation of the rotor main ring 2 is very small, and only the contact spring portion 2a suffers from a bending vibration unlike in the bending mode shown in FIG. 4.

SUMMARY OF THE INVENTION

It is an object of the present invention to prevent generation of the bending vibrations of the above-mentioned rotor main ring portion and rotor contact spring portion so as to prevent generation of these noise components.

The bending vibrations for generating these noise components are travelling waves.

A travelling wave is generated by synthesizing two natural vibrations, i.e., sin and cos modes. One aspect of the present invention is to prevent generation of the travelling wave, which is generated on the rotor, and causes noise.

Another aspect of the present invention is to provide a vibration driven actuator or motor, wherein a rotor main ring or a rotor contact spring, which has an axially symmetrical shape, is formed to have a proper asymmetrical shape to provide a large difference between the natural frequencies of the sin and cos modes of the vibration mode, so as not to easily excite the two modes (sin and cos modes) at the same frequency, i.e., not to easily excite a travelling wave thereby suppressing generation of noise.

DESCRIPTION OF THE PREFERRED EMBODIMENTS

Figure 1A:
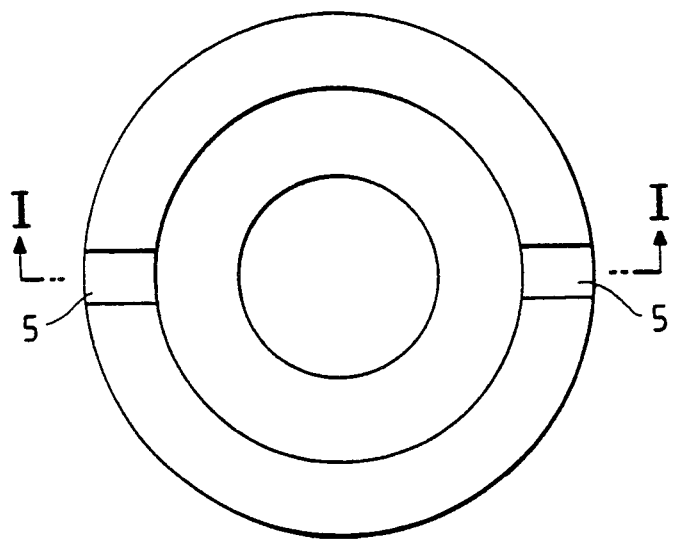
FIGS. 1A and 1B are respectively a plan view and a sectional view of a rotor of a vibration driven motor or actuator according to a first embodiment of the present invention.
Figure 1B:
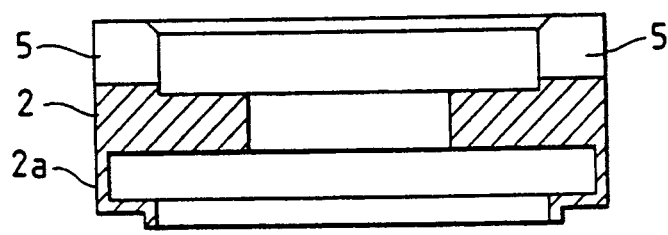
Figure 1C:
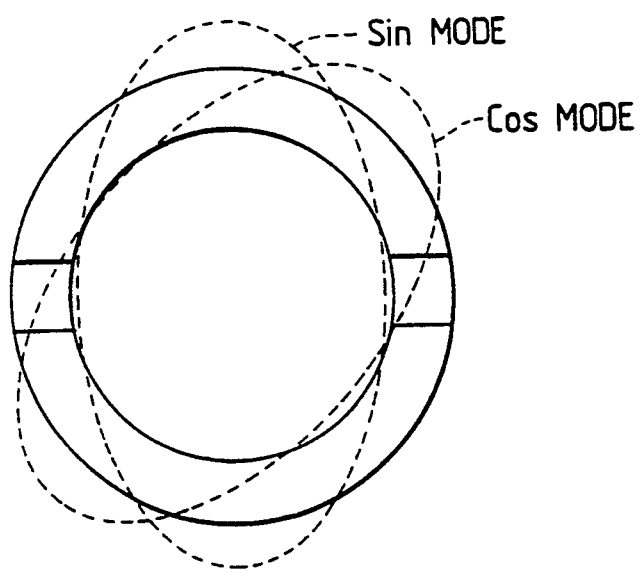
FIG. 1C is a plan view showing a vibration mode of the rotor.

FIGS. 1A to 1C show a rotor of a vibration driven motor or actuator according to the first embodiment of the present invention. FIG. 1A is a plan view of the rotor, and FIG. 1B is a sectional view taken along a line A—A in FIG. 1A. In FIGS. 1A and 1B, linear grooves 5 are formed on two upper peripheral portions of a rotor main ring 2. Note that a bar-shaped stator for driving the rotor shown in FIGS. 1A to 1C by a travelling wave, and other elements for generating the travelling wave in the stator are substantially the same as those described in, e.g., U.S. Pat. No. 5,124,611 or No. 4,562,374, and a detailed description thereof will be omitted. When the grooves 5 are formed in the rotor (2, 2a) driven by the travelling wave generated in the stator, sin and cos modes are generated at positions illustrated in FIG. 1C. Since the grooves 5 are formed at positions corresponding to the anti-node positions of the vibration of the sin mode, the mode rigidity is considerably decreased, and hence, the natural frequency of the sin mode is greatly lowered. However, since the grooves 5 are formed at positions corresponding to the node positions of the cos mode, a decrease in natural frequency of the cos mode is relatively small.

As a result, the two natural frequencies have a difference therebetween. More specifically, the natural frequencies of the two modes coincide with each other at 54 kHz before formation of the grooves. However, after the grooves are formed, the natural frequency of the sin mode is lowered to 51 kHz, and that of the cos mode is lowered to 53 kHz. Thus, a frequency difference of 2 kHz is generated between the two natural frequencies. When the rotor (2, 2a, 5) was driven by the above-mentioned known stator (or vibrating member), noise caused by generation of a bending natural vibration of the rotor main ring was reduced. In this embodiment, the grooves 5 are formed at two positions. If four grooves are formed at four positions separated by equal angular pitches, then the frequency difference between the two modes can be increased, and the noise prevention effect can be enhanced.

Figure 7:
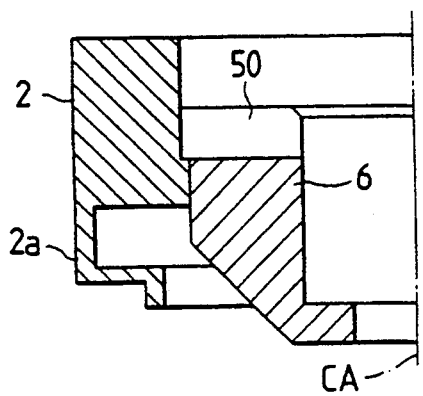
FIG. 7 is a sectional view showing a rotor of a vibration driven motor according to a second embodiment of the present invention.

FIG. 7 is a sectional view of main part of a ring-shaped rotor portion of a motor according to the second embodiment of the present invention. In FIG. 7, a member 6 receives a spring (not shown) for compressing a rotor (2, 2a) formed of a metal such as Fe, zinc, or the like. The member 6 is adhered to the rotor (2, 2a) to constitute an integrated structure. Note that the rotor (2, 2a, 6, 50) has a central axis CA.

Linear grooves 50 as in FIG. 1A are formed on an upper portion of the spring receiving member 6, thus obtaining the same effect as in the first embodiment.

In this manner, the same effect as in the first embodiment can be obtained if another member integrated with the rotor is utilized.

Figure 8A:
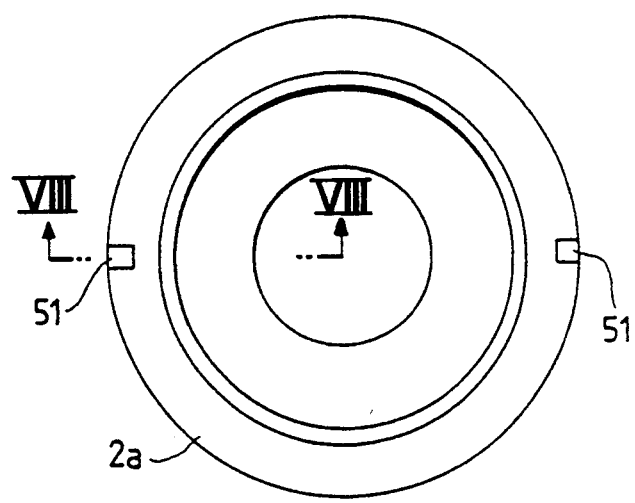
FIGS. 8A and 8B are respectively a plan view and a sectional view of a rotor of a vibration driven motor according to a third embodiment of the present invention.
Figure 8B:
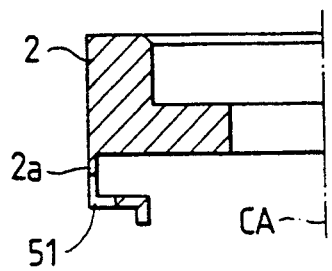

FIGS. 8A and 8B show the third embodiment of the present invention. This embodiment takes a countermeasure against generation of noise caused by generation of a bending vibration of a contact spring portion of a ring-shaped rotor. FIG. 8A is a plan view of a rotor when viewed from a side contacting a vibrating member, and FIG. 8B is a partial longitudinal sectional view of the rotor. Groove portions 51 are formed on corner portions of a rotor contact spring of the rotor, and noise can be prevented for the same reason as described above. Note that the ring-shaped rotor (2, 2a, 51) has a central axis CA.

Figure 9A:
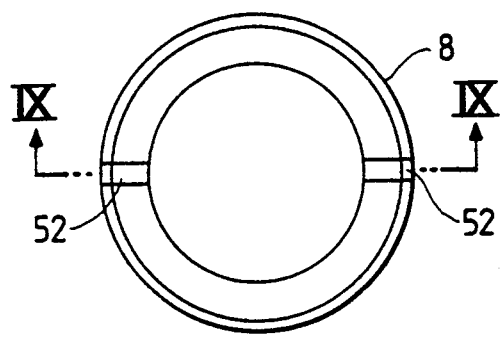
FIGS. 9A and 9B are respectively a plan view and a sectional view of a rotor of a vibration driven motor according to the fourth embodiment of the present invention.
Figure 9B:
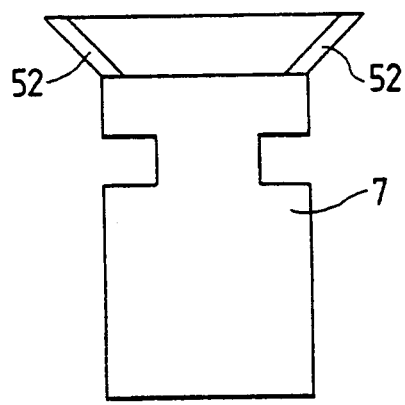

FIGS. 9A and 9B show the fourth embodiment of the present invention.

Figure 2:
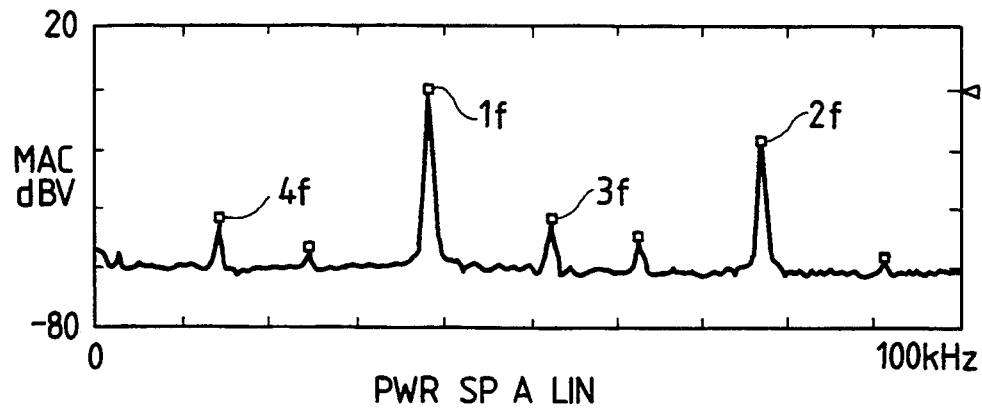
FIG. 2 is a graph showing a vibration spectrum of noise.
Figure 3:
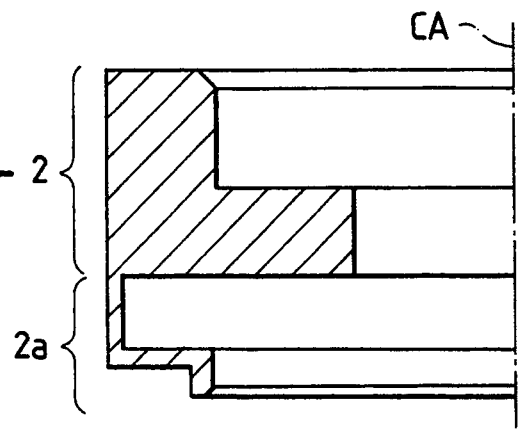
FIG. 3 is a sectional view of a conventional rotor.
Figure 4:
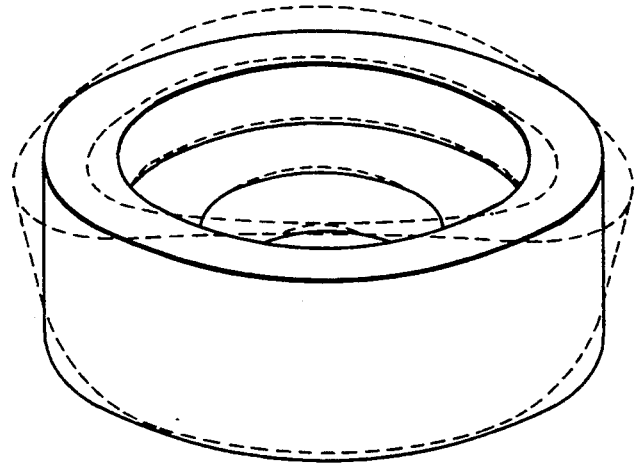
FIG. 4 is a perspective view showing a vibration mode of a conventional rotor main ring, which causes noise.
Figure 5:
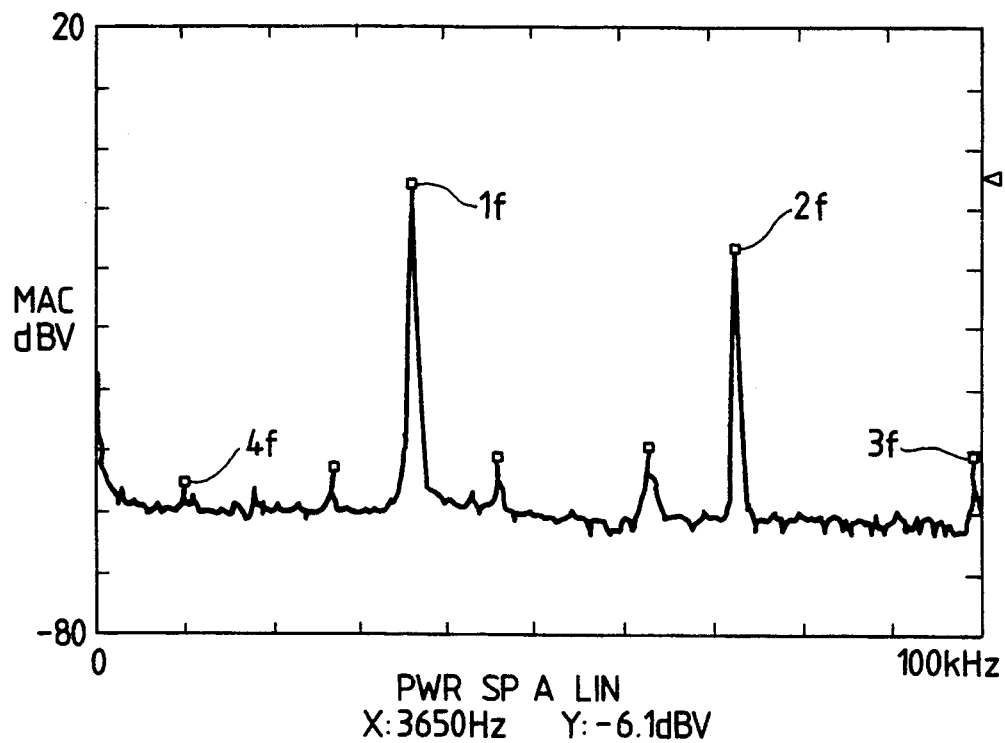
FIG. 5 is a graph showing a vibration spectrum of another noise.
Figure 6:
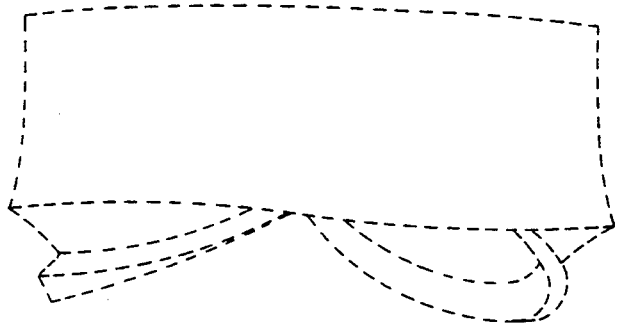
FIG. 6 is a view showing a bending vibration mode of a conventional rotor contact spring, which causes noise.

In this embodiment, a contact spring structure 8 is provided on a vibrating member 7, which is the same as that disclosed in FIG. 2 of U.S. Pat. No. 4,562,374 or in U.S. Pat. No. 5,124,611. Noise caused by a bending vibration generated in this portion is prevented by grooves 52.

Figure 10A:
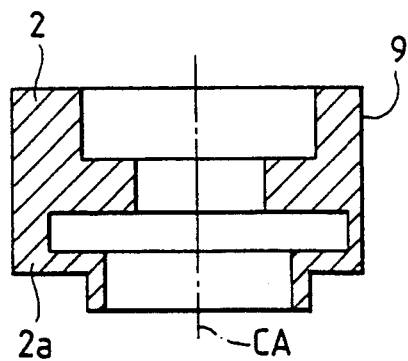
FIGS. 10A and 10B are respectively a plan view and a sectional view of a rotor of a vibration driven motor according to a fifth embodiment of the present invention.
Figure 10B:
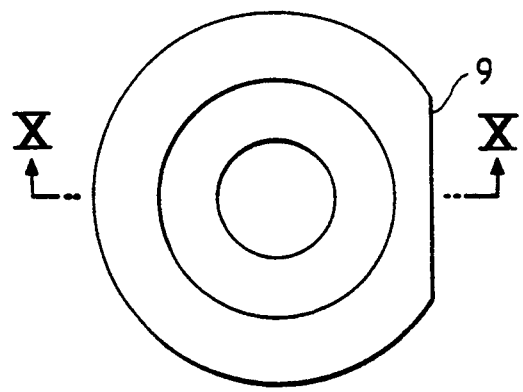
Figure 11:
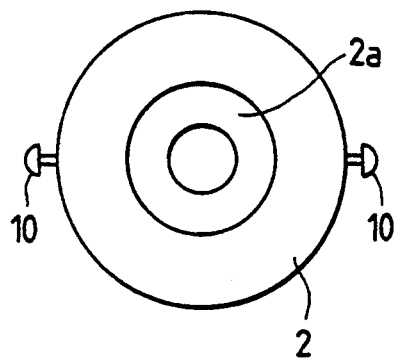
FIG. 11 is a plan view showing a vibrating member of a vibration driven motor according to a sixth embodiment of the present invention.

In each of the above embodiments, the two components, i.e., sin and cos modes of a vibration generated in the rotor are caused to have different natural frequencies by forming the grooves, thereby preventing generation of a travelling wave in the rotor, and reducing noise. As shown in FIGS. 10A and 10B, a rotor may have an axially asymmetrical shape by forming a chamfer portion 9 on the side surface of a rotor (2, 2a), so that the sin and cos modes have different natural frequencies, thereby simultaneously taking countermeasures against noise for both the rotor main ring 2 and the contact spring 2a. Alternatively, as shown in FIG. 11, masses 10 such as screws may be added to the rotor (2, 2a).

In each of the above embodiments, a countermeasure against noise is taken by forming grooves on two peripheral portions. However, when a mode causing noise is the third or fourth bending vibration, three or six grooves, or four or eight grooves are preferably formed at equal angular pitches. When noise components are generated due to the second and third vibrations, both two equal-pitch grooves and three equal-pitch grooves are formed, thereby simultaneously taking countermeasures against the noise components caused by these two vibrations.

Figure 12:
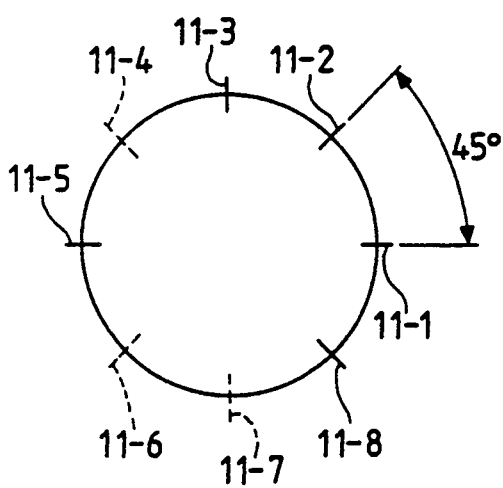
FIG. 12 is a plan view showing a vibrating member of a vibration driven motor according to a seventh embodiment of the present invention.

Eight equal-pitch grooves 11-1 to 11-8 need not always be formed for the fourth bending vibration. For example, as shown in FIG. 12, some grooves (11-4, 11-6, and 11-7) may be omitted to obtain the same effect as described above.

Figure 13:
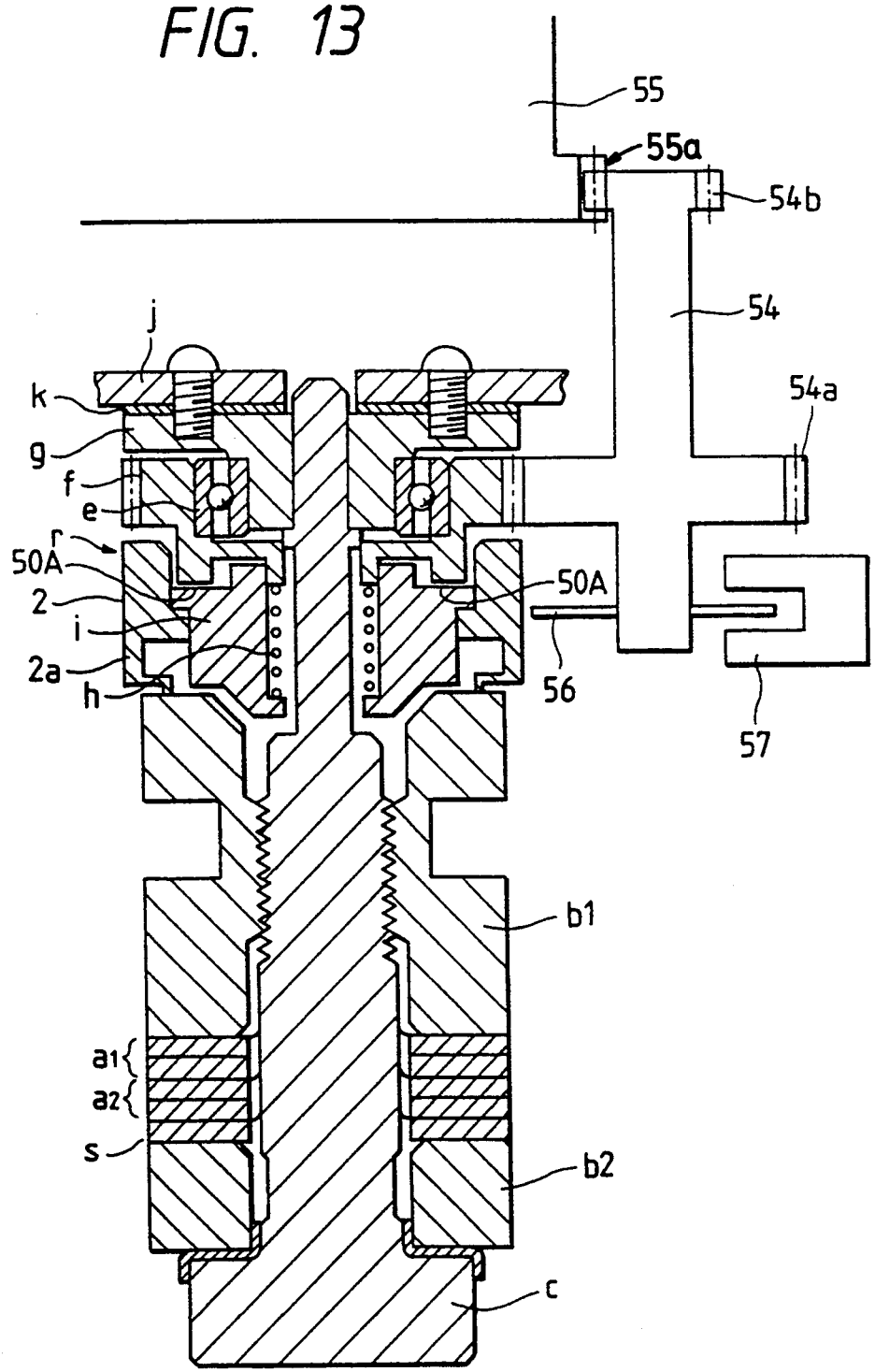
FIG. 13 is a schematic sectional view showing an apparatus which utilizes a vibration driven motor of the present invention as a driving source.

FIG. 13 is a schematic sectional view showing an embodiment of an assembled state of a vibration driven motor according to the present invention, which motor has a linear-shaped groove 50A on an outer peripheral portion of a spring case i, and an apparatus (a camera in this embodiment), which utilizes this vibration driven motor as a driving source.

As disclosed in the above-mentioned U.S. Pat. No. 5,124,611, vibrating member structural bodies $b_1$ and $b_2$ are fastened by a bolt c to sandwich A- and B-phase piezoelectric elements $a_1$ and $a_2$ and an electrode plate therebetween, thereby constituting a bar-shaped vibrating member.

When electrical signals having a temporal phase difference therebetween are supplied to the piezoelectric elements $a_1$ and $a_2$, bending vibrations are generated in a plurality of different planes including the axis of the vibrating member, and a rotation is formed on the surface of the vibrating member.

A rotor r is constituted by a rotor main ring 2 and a rotor contact spring 2a. The rotor r is urged against the driving surface of the vibrating men, bet ($b_1$, $b_2$, $a_1$, $a_2$, c) via a compression spring h and a spring case i. A rotary output member f is formed with a gear portion on its outer circumferential surface, and is axially supported by a bearing e. The rotary output member f has two projections which are inserted loosely to linear-shaped grooves provided on a portion of spring case i, and is rotated integrally with the rotor r. A fixing member g is fixed to the distal end portion of the bolt c, and is attached to a stationary member (e.g., a stationary cylinder of a lens barrel) j by screws via a rubber sheet k.

A gear 54 is constituted by large and small gear portions 54a and 54b. The large gear portion 54a is meshed with the gear portion of the rotary output member f, thus extracting the output of the bar-shaped vibration driven motor. A driven member (e.g., a lens barrel of a camera) 55 has a gear portion 55a, which is meshed with the small gear portion 54a, and is rotated by the vibration driven motor so as to attain, e.g., an auto-focus (AF) function. A slit plate 56 is rotated integrally with the gear 54. A photocoupler 57 detects rotation of the gear 54.

As described above, noise generated in the bar-shaped vibration driven motor or actuator includes a noise component caused by a bending vibration generated in a movable member, e.g., the rotor main ring, and a noise component caused by a bending vibration generated in the contact spring portion of the rotor. Since the natural vibration modes (sin and cos modes) causing these noise components are caused to have a frequency difference therebetween by forming grooves or adding masses to the rotor main ring or the contact spring portion, generation of noise can be suppressed.

In each of the above embodiments, the vibrating member is fixed, and the rotor is moved. In contrast to this, the present invention can be applied to an actuator which has a movable vibrating member. Of course, in this case, grooves or the like for providing a natural frequency difference between the sin and cos modes are formed on a fixed member.

What is claimed is:

1. A vibration driven motor or actuator comprising:
   a vibrating member for generating a vibration therein in response to an electrical signal applied thereto; and
   a contact member, frictionally engaged with said vibrating member, to be driven by said vibration, said contact member having a vibration noise suppressing element for causing sin and cos modes of said vibration generated in the contact member to have different natural frequencies, when said contact member is driven by the vibration.

2. A vibration driven motor or actuator according to claim 1, wherein said contact member is a ring-shaped member.

3. A vibration driven motor or actuator according to claim 2, wherein said vibration noise suppressing element causes the ring-shaped member to have an axially asymmetrical shape.

4. A vibration driven motor or actuator according to claim 2, wherein said vibration noise suppressing element comprises a slit provided on a portion of said contact member.

5. A vibration driven motor or actuator according to claim 2, wherein said vibration noise suppressing element comprises a ring-shaped groove provided on a portion of said contact member.

6. A vibration driven motor or actuator according to claim 5, wherein said vibrating member includes a vibrating element and a pair of electro-mechanical energy conversion elements which respond to respective electrical signals having a phase difference in time therebetween, so as to generate bending vibrations in different planes.

7. A vibration driven system comprising:
   a vibrating member for generating a vibration therein a response to an electrical signal applied thereto;
   a contact member, frictionally engaged with said vibrating member, to be driven by said vibration, said contact member having a vibration noise suppressing element for causing sin and cos modes of said vibration generated in the contact member to have different natural frequencies when said contact member is driven by the vibration; and
   an output transmission member, engaged with one of said contact member and said vibrating member, for moving a portion of the system.

8. A vibration driven system according to claim 7, wherein said contact member is a ring-shaped member.

9. A vibration driven system according to claim 8, wherein said vibration noise suppressing element comprises a slit provided on a portion of said contact member.

10. A vibration driven system according to claim 8, wherein said vibration noise suppressing element comprises a linear-shaped groove provided on a portion of said contact member.

11. A vibration driven system according to claim 10, wherein said vibrating member includes a vibrating element and a pair of electro-mechanical energy conversion elements which response to respective electrical signals having a phase difference in time therebetween, so as to generate bending vibrations in different planes.

12. A rotor device for a vibration driven motor or actuator having a vibrating member for generating a vibration therein in response to an electrical signal applied thereto, the rotor comprising:
   a rotor member, frictionally engageable with a vibrating member, to be driven by a vibration, said rotor member having a vibration noise suppressing element for causing sin and cos modes of a vibration generated in the rotor member to have different natural frequencies when said rotor is driven by the vibration.

13. A vibration driven motor or actuator comprising:
a vibrating member;
a pair of electro-mechanical energy conversion elements which respond to respective electrical signals having a phase difference in time therebetween, so as to generate bending vibrations in different planes, whereby a combined vibration of the two bending vibrations is generated in said vibrating member; and
a rotor, frictionally engaged with said vibrating member, to be rotated by said vibration, said rotor having a first element causing sin and cos modes of said vibration generated in the rotor to have different natural frequencies when said rotor is rotated, and a support element for receiving an urging member for urging said rotor against said vibrating member.

14. A vibration driven motor or actuator according to claim 13, wherein said vibration noise suppressing element comprises a groove provided on a portion of said support element.

15. A vibration driven motor or actuator according to claim 14, wherein said vibrating member is a bar-shaped member, and the rotor is a ring-shaped member which contacts an upper surface of the bar-shaped vibrating member.

16. A vibration driven motor or actuator comprising:
a vibrating member;
a pair of electro-mechanical energy conversion elements which respond to respective electrical signals having a phase difference in time therebetween, so as to generate bending vibrations in different planes, whereby a combined vibration of two bending vibrations is generated in said vibrating member; and
a rotor, frictionally engaged with said vibrating member, to be rotated by said vibration, said rotor having a groove formed on a portion thereof and extending in a radial direction of the rotor, for causing sin and cos modes of said vibration generated in the rotor to have different natural frequencies when said rotor is rotated, and having a supporting member for receiving an urging member for urging said rotor against said vibrating member.

17. A vibration driven motor or actuator comprising:
a vibrating member, having a contact surface, for generating a vibration therein in response to an electrical signal applied thereto; and
a contact member having a continuous contact surface frictionally engaged with the contact surface of said vibrating men, her, said contact member further having a vibration noise suppressing element for causing sin and cos modes of said vibration generated in the contact member to have difference natural frequencies when said contact member is driven by the vibration.

18. A vibration driven system comprising:
a vibrating member, having a contact surface, for generating a vibration therein in response to an electrical signal applied thereto;
a contact member having a continuous contact surface frictionally engaged with the contact surface of said vibrating member, said contact member further having a vibration noise suppressing element for causing sin and cos modes of said vibration generated in the contact member to have different natural frequencies when said contact member is driven by the vibration; and
an output transmission member, engaged with one of said contact member and said vibrating member, for moving a portion of the system.

19. A rotor device for a vibration driven motor or actuator including a vibrating member, having a contact surface, for generating a vibration therein in response to an electrical signal applied thereto, the rotor comprising:
a rotor member having a continuous contact surface frictionally engaged with the contact surface of said vibrating member; and
a vibration noise suppressing element for causing sin and cos modes of said vibration generated in the rotor member to having different natural frequencies when said rotor member is driven by the vibration.

20. A vibration driven motor or actuator comprising:
a vibrating member having a contact surface;
a pair of electro-mechanical energy conversion elements which respond to respective electrical signal having a phase difference in time therebetween, so as to generate bending vibrations in different planes, whereby a combined vibration of two bending vibrations is caused in said vibrating member; and
a rotor having a continuous contact surface in contact with the contact surface of said vibrating member, said rotor having a groove, formed in a portion thereof and extending in a radial direction of the rotor, for causing sin and cos modes of said vibration generated in the rotor to have different natural frequencies when said rotor is rotated, and having a supporting member for receiving an urging member for urging said rotor against said vibrating member.

* * * * *

UNITED STATES PATENT AND TRADEMARK OFFICE
CERTIFICATE OF CORRECTION

PATENT NO. : 5,359,251

DATED : October 25, 1994

INVENTOR(S) : TAKAYUKI TSUKIMOTO, ET AL.

It is certified that error appears in the above-indentified patent and that said Letters Patent is hereby corrected as shown below:

On the title page:

At [56] References Cited

FOREIGN PATENT DOCUMENTS
```
"2026283    1/1990    Japan   .
 4026385    1/1992    Japan   ." should read --2-26283   1/1990    Japan   .
  4-26385   1/1992    Japan   .--.
```

IN THE DISCLOSURE:

COLUMN 1:

Line 15, "motor" should read --a motor--.
Line 20, "men%her" should read --member--.

COLUMN 2:

Line 12, "prevent" should read --present--, and "present" should read --prevent--.

COLUMN 3:

Line 14, "the fourth" should read --a fourth--.
Line 36, "A-A" should read --I-I--.

COLUMN 5:

Line 22, "men, bet" should read --member--.
Line 40, "portion 54a," should read --portion 54b,--.

UNITED STATES PATENT AND TRADEMARK OFFICE
CERTIFICATE OF CORRECTION

PATENT NO. : 5,359,251
DATED : October 25, 1994
INVENTOR(S) : TAKAYUKI TSUKIMOTO, ET AL.

It is certified that error appears in the above-indentified patent and that said Letters Patent is hereby corrected as shown below:

<u>COLUMN 6</u>:

Line 32, "a" should read --in--.
    Line 57, "response" should read --respond--.

<u>COLUMN 7</u>:

Line 52, "men, her," should read --member,--.

<u>COLUMN 8</u>:

Line 3, "ference" should read --ferent--.
    Line 37, "signal" should read --signals--.

Signed and Sealed this

Eleventh Day of April, 1995

Attest:

BRUCE LEHMAN

*Attesting Officer*      *Commissioner of Patents and Trademarks*